(12) United States Patent
Kim et al.

(10) Patent No.: US 9,753,206 B2
(45) Date of Patent: Sep. 5, 2017

(54) LIGHT GUIDE PLATE, AND BACKLIGHT UNIT AND DISPLAY DEVICE INCLUDING THE SAME

(71) Applicant: New Optics, Ltd, Yangju-si (KR)

(72) Inventors: Dong-Yong Kim, Cheonan-si (KR); Jong-Moon Yoon, Yangju-si (KR); Min-Kyoung Park, Seoul (KR)

(73) Assignee: New Optics, Ltd, Gyeonggi-do (KR)

( * ) Notice: Subject to any disclaimer, the term of this patent is extended or adjusted under 35 U.S.C. 154(b) by 16 days.

(21) Appl. No.: 14/828,575

(22) Filed: Aug. 18, 2015

(65) Prior Publication Data

US 2016/0047967 A1    Feb. 18, 2016

Related U.S. Application Data

(60) Provisional application No. 62/038,723, filed on Aug. 18, 2014.

(30) Foreign Application Priority Data

Mar. 31, 2015 (KR) ........................ 10-2015-0045732

(51) Int. Cl.
   *F21V 8/00* (2006.01)
(52) U.S. Cl.
   CPC .................................. *G02B 6/0036* (2013.01)
(58) Field of Classification Search
   CPC .. G02B 6/0055; G02B 6/0045; G02B 6/0036; G02B 6/0065
   See application file for complete search history.

(56) References Cited

U.S. PATENT DOCUMENTS

| 2002/0085150 | A1* | 7/2002 | Funamoto | G02F 1/133553 349/113 |
| 2002/0141174 | A1* | 10/2002 | Parker | A61M 21/02 362/612 |
| 2004/0051826 | A1* | 3/2004 | Lee | G02F 1/133553 349/113 |
| 2005/0024849 | A1* | 2/2005 | Parker | F21V 5/00 362/600 |
| 2005/0270802 | A1* | 12/2005 | Hsu | G02F 1/133615 362/626 |
| 2009/0316433 | A1* | 12/2009 | Shim | G02B 6/0038 362/613 |
| 2011/0109533 | A1* | 5/2011 | Suzuki | G02B 6/0038 345/84 |

(Continued)

*Primary Examiner* — Anh Mai
*Assistant Examiner* — Fatima Farokhrooz

(57) ABSTRACT

Provided are a light guide plate, and a backlight unit and a display device including the same. The light guide plate includes a body including a light output surface configured to output light, a reflective surface provided opposite the light output surface, and side surfaces provided between the light output surface and the reflective surface; and a plurality of dot pattern formed on a surface of the reflective surface, and the dot pattern includes a central embossed portion protruding to the outside of the reflective surface, a concave portion having a ring shape which surrounds the central embossed portion and recessed and formed in the reflective surface, and an outer embossed portion formed on an outer circumference surface of the concave portion and configured to protrude to the outside of the reflective surface.

12 Claims, 19 Drawing Sheets

(56) References Cited

U.S. PATENT DOCUMENTS

| | | | |
|---|---|---|---|
| 2011/0228556 A1* | 9/2011 | Wang | G02B 6/0036 362/606 |
| 2012/0075887 A1* | 3/2012 | Parker | F21V 5/00 362/612 |
| 2012/0201045 A1* | 8/2012 | Gotou | G02B 6/0061 362/602 |
| 2012/0327685 A1* | 12/2012 | Song | G02B 6/0036 362/607 |
| 2013/0063976 A1* | 3/2013 | Hong | F21V 13/02 362/608 |

* cited by examiner

LIGHT GUIDE PLATE, AND BACKLIGHT UNIT AND DISPLAY DEVICE INCLUDING THE SAME

RELATED APPLICATIONS

This application claims the benefit of priority of both U.S. Provisional Patent Application No. 62/038,723 filed on Aug. 18, 2014, and Korean Patent Application No. 10-2015-0045732 filed on Mar. 31, 2015. The contents of the above applications are all incorporated by reference as if fully set forth herein in their entirety.

FIELD AND BACKGROUND OF THE INVENTION

The present invention relates to a light guide plate, a backlight unit and a display device including the same, and more particularly, a light guide plate capable of improving a light diffusion degree, and a backlight unit and a display device including the same.

As a backlight unit (BLU) is one type of light source devices which supply light to the rear surface of a screen of each liquid crystal display (LCD) device, the BLU influences image qualities, such as the luminance of an image, color reproducibility, a viewing angle, a contrast range, legibility, etc., power consumption, a product lifetime, etc., and is a core component which accounts for approximately 20 to 50% of an overall cost of the LCD device.

The BLU is largely classified as a direct-lit type and an edge-lit type according to an arrangement position of a light source. The direct-lit type uses light projected from the light source disposed in the direct rear of a screen light and moved in a direction of a liquid crystal panel, but the edge-lit type supplies light to a display panel by guiding light projected from a light source disposed on an edge of a screen in a side direction to a liquid crystal panel using a light guide plate. Due to a structural difference between the direct-lit type and the edge-lit type, the direct-lit type has advantages for luminance, a contrast range, screen uniformity, image reproducibility, etc., and the edge-lit type has advantages for a product thickness and costs.

Recently, edge-lit type backlights having an advantage of a product exterior have been increasingly important in the display industry because a display product becomes more important for the value of an indoor interior decoration. Particularly, the trend of consumer demands for ultra-thin display products is increasing and studies for reducing diffusion sheets, about 3 to 5 diffusion sheets disposed in the rear of a display panel, as much as possible are actively conducted according to the trend. This type of the display product has problems that a light diffusion degree thereof is difficult to secure as much as that of existing diffusion sheets and a hot spot is issued due to the light diffusion degree. Therefore, the development of a light guide plate capable of improving the light diffusion degree is emerging as a key technology.

SUMMARY OF THE INVENTION

The present invention is directed to providing a light guide plate capable of improving a light diffusion degree, and a backlight unit and a display device including the same.

The present invention is also directed to providing a light guide plate capable of suppressing a hot spot, and a backlight unit and a display device including the same.

One aspect of the present invention provides a light guide plate including a body including a light output surface configured to output light, a reflective surface provided opposite the light output surface, and side surfaces provided between the light output surface and the reflective surface; and a plurality of dot patterns formed on a surface of the reflective surface.

Here, each of the dot pattern includes a central embossed portion protruding to the outside of the reflective surface, a concave portion having a ring shape which surrounds the central embossed portion and recessed and formed in the reflective surface, and an outer embossed portion formed on an outer circumference surface of the concave portion and configured to protrude to the outside of the reflective surface.

Another aspect of the present invention provides a backlight unit including a light source configured to output light; and a light guide plate including a light incident surface positioned to face the light source and configured to receive light emitted from the light source, a light output surface connected to the light incident surface and configured to output the light in a direction of a display panel, and a reflective surface opposite the light output surface.

Here, a plurality of dot patterns are formed on the reflective surface to change a path of the output light. Further, the dot pattern includes a central embossed portion formed in a circular shape, a concave portion formed in a ring shape which surrounds the central embossed portion, and an outer embossed portion formed on an outer circumference surface of the concave portion and configured to scatter light moved to the central embossed portion and the concave portion.

According to the embodiment of the present invention, a dot pattern in which a concave portion and an embossed portion are trebly formed scatters light, and thus a degree of scattering or diffusion of light output from the light guide plate can be improved.

Further, according to the embodiment of the present invention, since the light guide plate capable of improving the degree of scattering is used, a hot spot can be improved.

DESCRIPTION OF SPECIFIC EMBODIMENTS OF THE INVENTION

Figure 1:
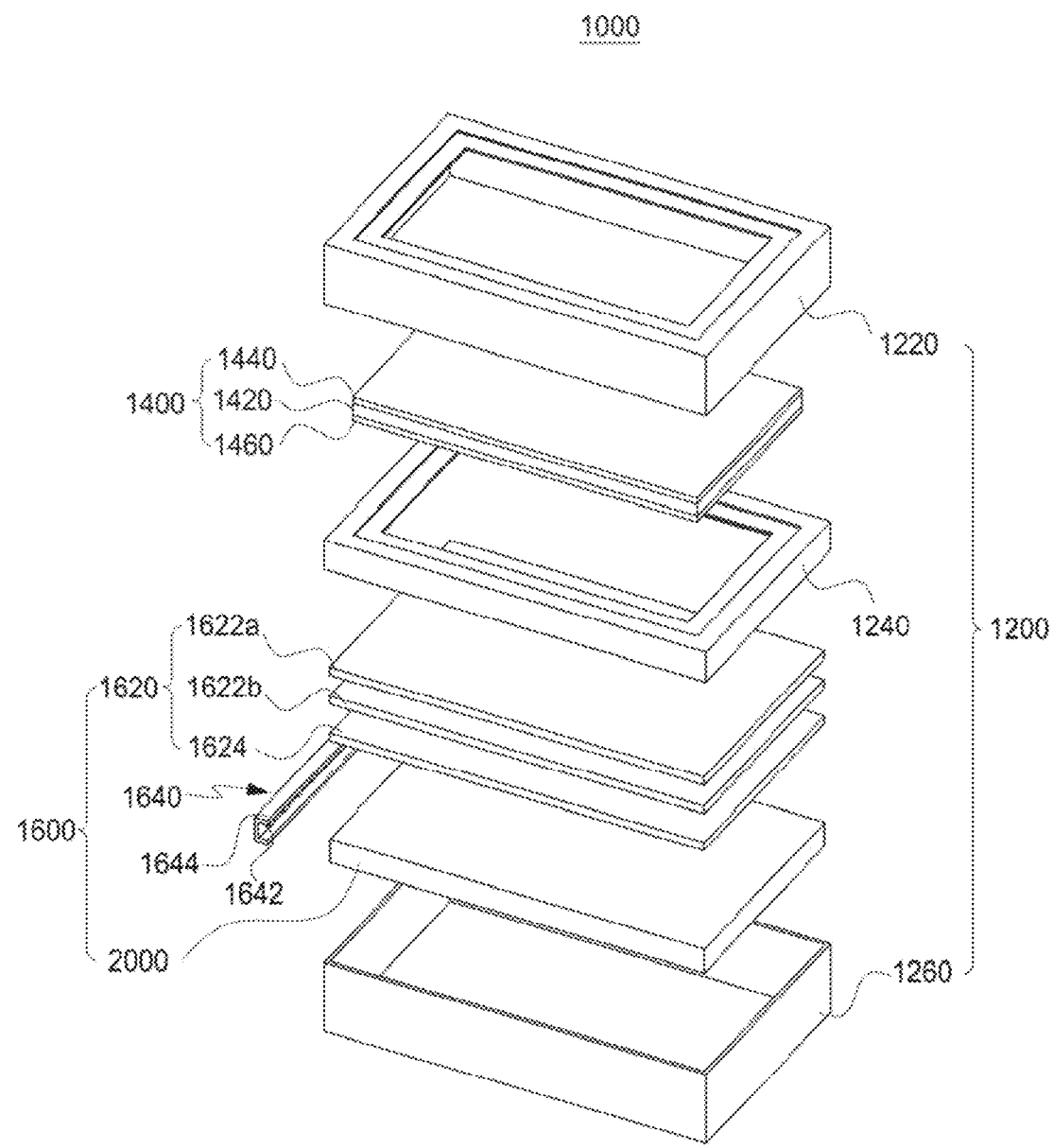
FIG. 1 is an exploded perspective view of a display device according to one embodiment of the present invention.

Hereinafter, a light guide plate according to one embodiment of the present invention, and a backlight unit and a display device including the same will be described with reference to the accompanying drawings in detail.

Further, the same or corresponding components may be assigned with the same or similar reference numerals regardless of drawing numerals and the repetitive description thereof will be omitted. The size and shape of each component shown for the sake of convenience of the description may be exaggerated or reduced.

One aspect of the present invention provides a light guide plate including a body including a light output surface configured to output light, a reflective surface provided opposite the light output surface, and side surfaces provided between the light output surface and the reflective surface, and a plurality of dot patterns formed on a surface of the reflective surface. Here, each of the dot pattern includes a central embossed portion protruding to the outside of the reflective surface, a concave portion having a ring shape which surrounds the central embossed portion and recessed and formed in the reflective surface, and an outer embossed portion formed on an outer circumference surface of the concave portion and configured to protrude to the outside of the reflective surface.

The outer embossed portion may be formed in a ring shape along the outer circumference surface of the concave portion.

In the outer embossed portion, a height of a region close to a first side surface of the side surfaces may be the greatest.

In the outer embossed portion, a height of a region close to a second side surface facing the first side surface of the side surfaces may be the smallest.

In the outer embossed portion, a height of a region close to a first side surface of the side surfaces may be greater than that of a region close to a second side surface facing the first side surface of the side surfaces.

In the outer embossed portion, a height of a region close to a third side surface connected to the first side surface of the side surfaces may be substantially the same as that of a region close to a fourth side surface facing the third side surface of the side surfaces.

In the outer embossed portion, the heights of the regions close to the third side surface and the fourth side surface may be smaller than the height of the region close to the first side surface, and greater than the height of the region close to the second side surface.

In the outer embossed portion, the heights of the regions close to the third side surface and the fourth side surface may be smaller than the heights of the regions close to the first side surface and the second side surface.

The first side surface may be a light incident surface which receives light from a light source.

A plurality of serration patterns formed in embossed or concaved shapes in a vertical direction may be formed on the light incident surface.

The outer embossed portion has a different height based on a distance from a light incident surface which is any one of the side surfaces.

The central embossed portion and the concave portion may diffuse light when the light incident on the dot pattern is output in an upward direction through the light output surface, and the outer embossed portion may scatter light when the light incident on the dot pattern moves to the central embossed portion and the concave portion.

In the outer embossed portion, a height of a region close to a light incident surface of the side surfaces on which light is incident may be formed to be the greatest to scatter the light moved from a light source to the dot pattern.

A height of the central embossed portion may be greater than that of the outer embossed portion.

A depth of the concave portion may be greater than a height of the central embossed portion.

A radius of the central embossed portion may be greater than a width of the concave portion, and a width of the outer embossed portion may be smaller than the width of the concave portion.

Another aspect of the present invention provides an optical sheet including a body having two primary surfaces facing each other, and side surfaces positioned between the two primary surfaces; and a plurality of dot patterns formed on any one primary surface of the two primary surfaces. Each of the dot patterns includes a central embossed portion formed in a circular shape, a concave portion formed in a ring shape which surrounds the central embossed portion, and an outer embossed portion formed on an outer circumference surface of the concave portion when viewed in a direction perpendicular to the primary surface.

In the outer embossed portion, a height of a region close to a first side surface of the side surfaces may be greater than that of a region close to a second side surface facing the first side surface of the side surfaces.

The optical sheet may include any one of a light guide plate used in an edge-lit type backlight unit, a diffusion plate used in a direct-lit type backlight unit, and a diffusion sheet interposed between a light guide plate of a backlight unit and a display panel.

Still another aspect of the present invention provides a backlight unit including a light source configured to output light, and a light guide plate including a light incident surface positioned to face the light source and configured to receive light emitted from the light source, a light output surface connected to the light incident surface and configured to output the light in a direction of a display panel, and a reflective surface opposite the light output surface.

Here, a plurality of dot patterns are formed on the reflective surface to change a path of the output light. Further, each of the dot patterns includes a central embossed portion formed in a circular shape, a concave portion formed in a ring shape which surrounds the central embossed portion, and an outer embossed portion formed on an outer circumference surface of the concave portion and configured to scatter light moved to the central embossed portion and the concave portion.

The outer embossed portion has a different height based on a distance from the light source.

In the outer embossed portion, a height of a region close to the light source may be greater than that of a region far from the light source.

A height of the central embossed portion may be greater than that of the outer embossed portion and smaller than a depth of the concave portion.

The height of the central embossed portion may be greater than that of the outer embossed portion and a depth of the concave portion.

Hereinafter, a display device 1000 according to one embodiment of the present invention will be described. Here, the display device 1000 should be interpreted as a concept including all of various display devices which output images in addition to liquid crystal display (LCD) devices, plasma display panel (PDP) display devices, and organic light-emitting diode (OLED) display devices. However, it will be described based on the LCD device 1000 for the sake of convenience of the description below.

Figure 2:
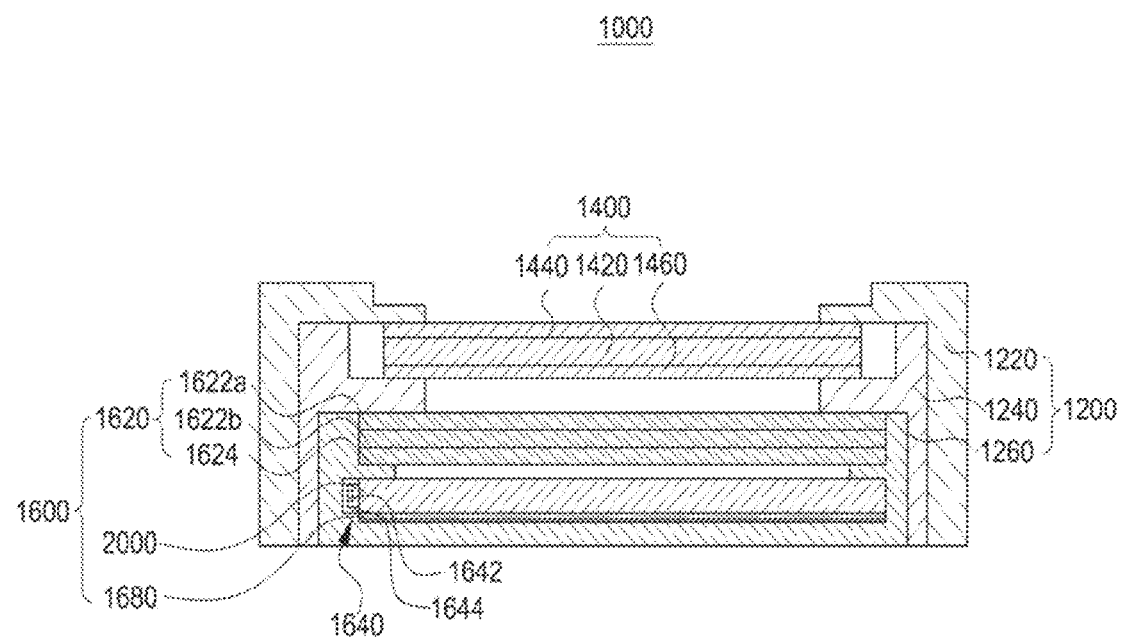
FIG. 2 is a cross-sectional view of the display device according to one embodiment of the present invention.

FIG. 1 is an exploded perspective view of the display device 1000 according to one embodiment of the present invention, and FIG. 2 is a cross-sectional view of the display device 1000 according to one embodiment of the present invention.

Referring to FIGS. 1 and 2, the display device 1000 may include a housing 1200, a display panel 1400, and a backlight unit 1600.

The housing 1200 accommodates the display panel 1400 and the backlight unit 1600 therein to protect from an external impact. Further, the housing 1200 serves to connect the display panel 1400 and the backlight unit 1600.

The housing 1200 may include a top case 1220, a guide frame 1240, and a bottom cover 1260. The top case 1220 and the bottom cover 1260 are coupled to respectively cover a front surface and a rear surface of the display device 1000, and the guide frame 1240 is mounted therebetween. The guide frame 1240 may fix the display panel 1400 with a bezel of the top case 1220 and may also fix a light guide plate 2000 and optical sheets 1620 with the bottom cover 1260.

The display panel 1400 displays an image using light supplied from the backlight unit 1600.

The display panel 1400 may include two transparent substrates and a liquid crystal layer 1420 interposed between the transparent substrates. Here, each of the transparent substrates may be a color filter substrate 1460 or a thin film transistor (TFT) substrate 1440. When an electrical signal is applied to the liquid crystal layer 1420 through a gate line and a data line of the TFT substrate 1440, the orientation of liquid crystals is changed, the liquid crystals selectively pass light projected from the backlight unit 1600 by pixel units, and the passed light is changed to color light by the color filter substrate 1460 to output an image. Here, the TFT substrate 1440 may be electrically connected to a panel driver (not shown), such as a chip-on-film (COF) or tape carrier package (TCP), through a printed circuit board (PCB) (not shown) and may receive a control signal.

The backlight unit 1600 supplies light to the rear of the display panel 1400 so that the display panel 1400 outputs an image.

The backlight unit 1600 may include an optical sheet 1620, a light source array 1640, a light guide plate 2000, and a reflective plate 1680.

The light source array 1640 may include a light source 1642 for generating light and a light source substrate 1644 on which the light source 1642 is installed. The light source 1642 may include a cold cathode fluorescent lamp (CCFL), an external electrode fluorescent lamp (EEFL), a light emitting diode (LED), etc. In the case of an edge-lit type backlight unit 1600, in order to project light to a side surface of the light guide plate 2000, the light source array 1640 may be installed on an edge of the display device 1000 so that light of the light source 1642 is projected in a side direction of the light guide plate 2000. In the case of a direct-lit type backlight unit 1600, the light source 1642 may be installed on the bottom cover 1260 to output light to the rear of the display panel 1400, and at this time, the light source substrate 1644 may be installed on the bottom cover 1260, or the light source substrate 1644 may be removed and the light source 1642 may be directly installed on the bottom cover 1260.

The light guide plate 2000 may be disposed to face a rear surface of the display panel 1400, in the edge-lit type backlight unit 1600. The light guide plate 2000 serves to guide light output in a side direction from the light source 1642 toward the display panel 1400. Further, patterns may each be formed on an upper surface, a lower surface, and a side surface of the light guide plate 2000, the side surface beside the light source 1642, to improve the uniformity of light such as improving luminance, hot spots, etc. Further, a material including poly methyl methacrylate (PMMA), methyl styrene (MS), methyl methacrylate (MMA), glass, or the like may be used for the material of the light guide plate 2000. The detailed description for the light guide plate 2000 will be described below. Meanwhile, in the case of the direct-lit type backlight unit 1600, a diffusion plate which diffuses light may be provided instead of the light guide plate 2000 which guides light.

The optical sheet 1620 is disposed to face the display panel 1400 in the rear of the display panel 1400, and when there is a light guide plate 2000, the optical sheet 1620 may be disposed between the display panel 1400 and the light guide plate 2000. An example of the optical sheet 1620 is a diffusion sheet 1624 or prism sheet 1622. The diffusion sheet 1624 improves the uniformity of light output dispersion because light output from the light guide plate 2000 or diffusion plate is evenly diffused, and the occurrence of a dark/bright pattern, such as a moire phenomenon, or hot spots may be reduced or removed. The prism sheet 1622 may adjust a path of light in a direction perpendicular to the display panel 1400. Light passed through the light guide plate 2000 or diffusion sheet 1624 disperses and moves in a forward direction and the prism sheet 1622 guides the dispersed light in a direction perpendicular to the display panel 1400, and thus the luminance and viewing angle of the display device 1000 can be improved. For example, as shown in FIGS. 1 and 2, in the optical sheet 1620, a vertical prism sheet 1622a, a horizontal prism sheet 1622b, and the diffusion sheet 1624 may be sequentially disposed from the display panel 1400. The arrangement order in the optical sheet 1620 does not have to be the same as the above-described order. That is, a part of the optical sheet 1620 may be removed or may use a number of sheets (e.g., two or more diffusion sheets 1624) and the order may be suitably changed if needed.

The reflective plate 1680 may be attached to the bottom cover 1260. The reflective plate 1680 may reflect light, which is output from the light source 1642 and moved in a rear direction, to the display panel 1400. Since the reflective plate 1680 reflects the light moved in a direction of a rear surface of the light guide plate 2000 or diffusion plate to the display panel 1400, the loss of light is reduced, and thus the overall luminance of the display is improved.

Hereinafter, the light guide plate 2000 according to one embodiment of the present invention will be described in more detail.

Figure 3:
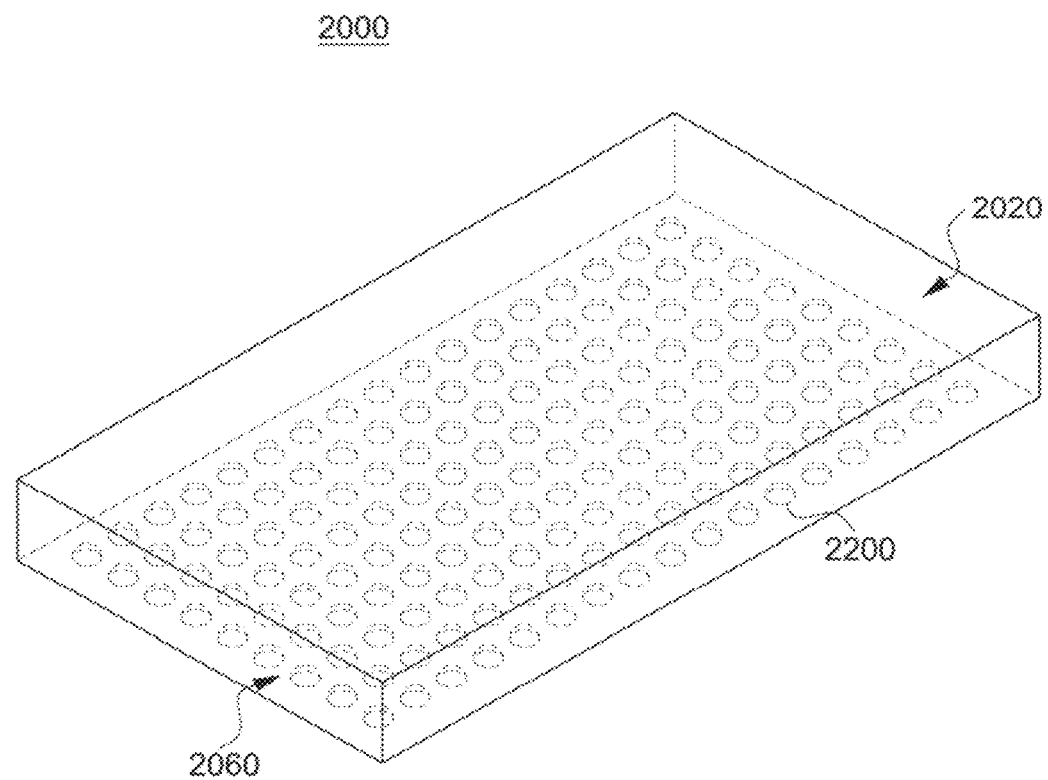
FIG. 3 is a perspective view of a light guide plate according to one embodiment of the present invention.
Figure 4:
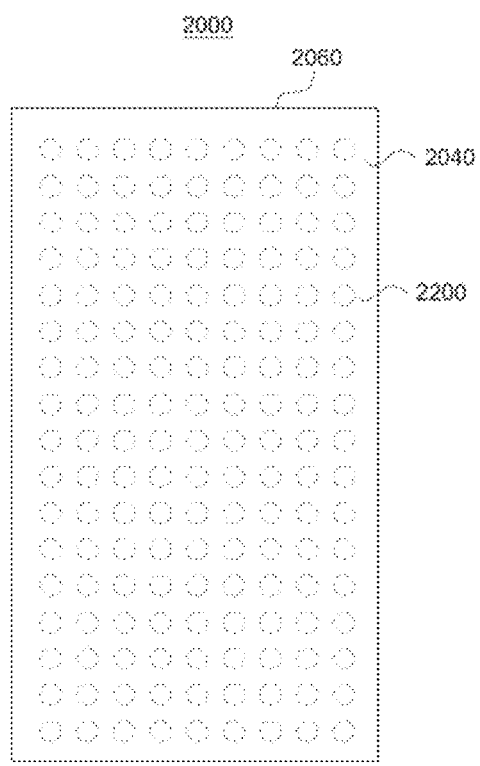
FIG. 4 is a rear view of the light guide plate in which the density of reflection patterns according to one embodiment of the present invention is uniform.
Figure 5:
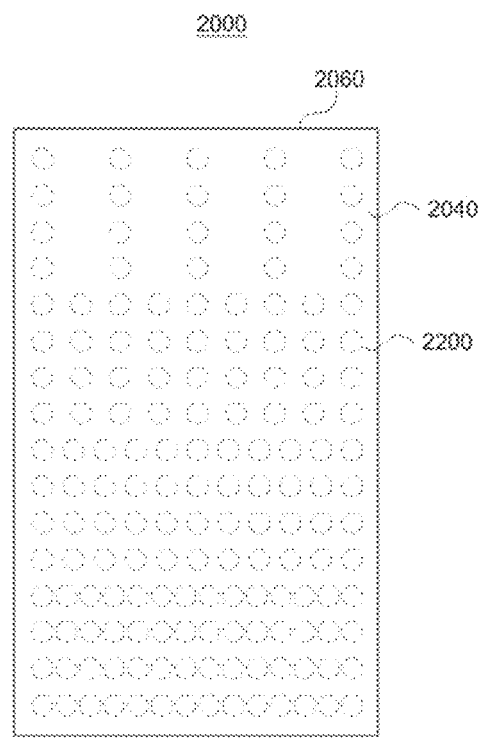
FIG. 5 is a rear view of the light guide plate in which the density of the reflection patterns according to one embodiment of the present invention is non-uniform.
Figure 6:
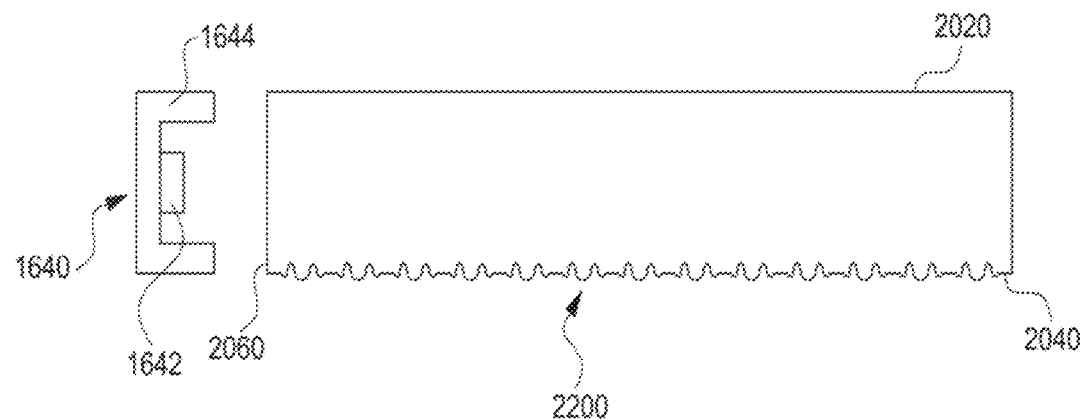
FIG. 6 is a cross-sectional view of the light guide plate according to one embodiment of the present invention.
Figure 7:
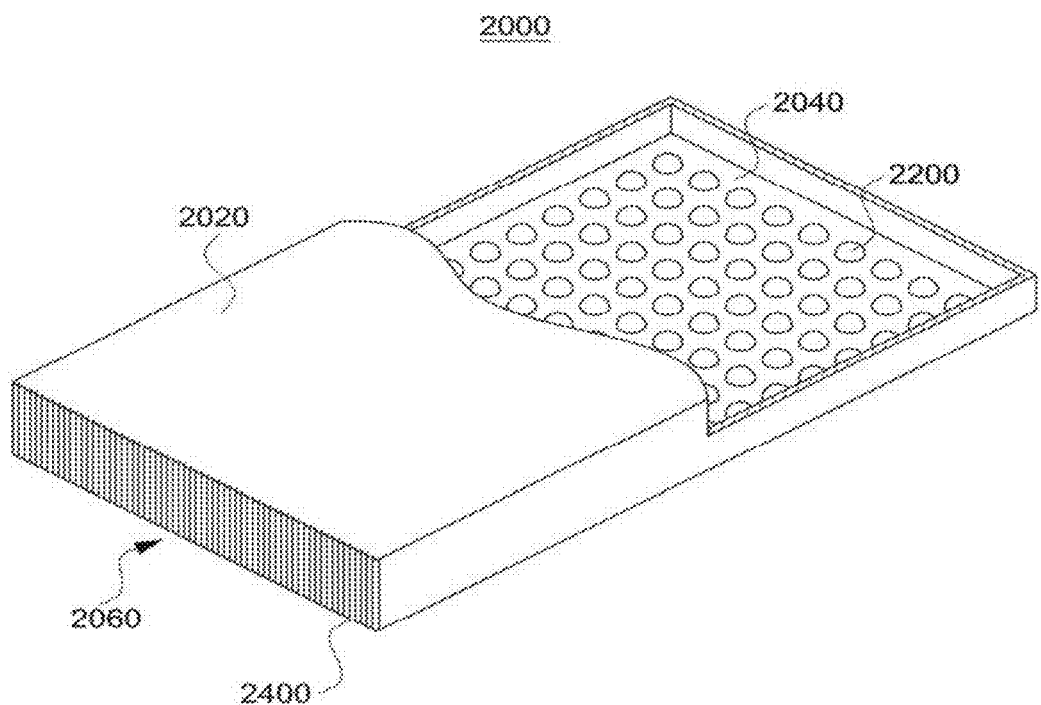
FIG. 7 is a perspective view of the light guide plate of which a light incident surface according to one embodiment of the present invention has a pattern.
Figure 8:
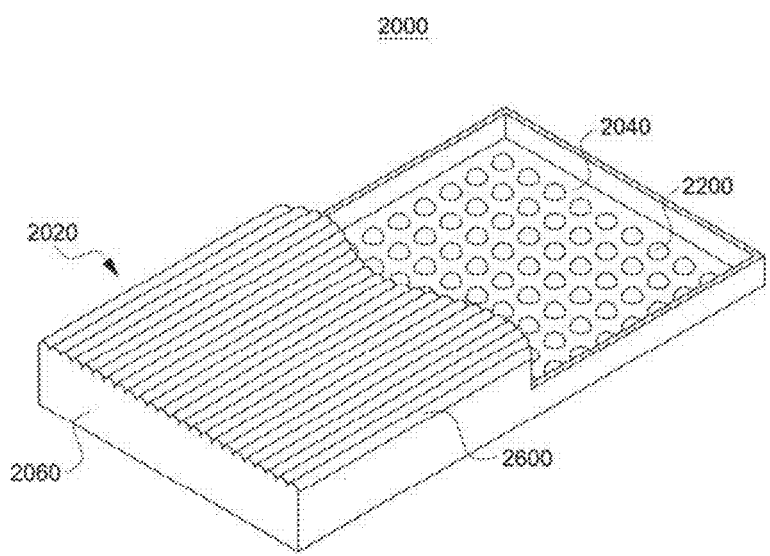
FIG. 8 is a perspective view of the light guide plate of which a light output surface according to one embodiment of the present invention has a pattern.

FIG. 3 is a perspective view of the light guide plate 2000 according to one embodiment of the present invention, FIG. 4 is a rear view of the light guide plate 2000 in which the density of a reflection patterns 2200 according to one embodiment of the present invention is uniform, FIG. 5 is a rear view of a light guide plate 2000 in which the density of the reflection patterns 2200 according to one embodiment of the present invention is non-uniform, FIG. 6 is a cross-sectional view of the light guide plate 2000 according to one embodiment of the present invention, FIG. 7 is a perspective view of the light guide plate 2000 of which a light incident surface 2060 according to one embodiment of the present invention has a pattern, and FIG. 8 is a perspective view of the light guide plate 2000 of which a light output surface 2020 according to one embodiment of the present invention has a pattern.

Referring to FIGS. 3, 4, 5, 6, 7 and 8, the light guide plate 2000 may be provided in a plate shape. Thus, the light guide plate 2000 may have a pair of primary surfaces and side surfaces which connect the primary surfaces. An upper surface of the pair of primary surfaces close to the display panel 1400 is a light output surface 2020 which outputs light to the display panel 1400, and the opposite surface thereof is a reflective surface 2040 which reflects light. Further, at least one surface of the side surfaces is disposed to face the light source 1642 and is the light incident surface 2060 which receives light. Generally, since the display device 1000 has a tetragonal screen, the light guide plate 2000 may also have a shape of a tetragonal plate corresponding thereto. In the case of the light guide plate 2000 in a shape of a tetragonal plate, any one surface, a pair of vertically facing surfaces, or a pair of laterally facing surfaces of four side surfaces may become the light incident surface 2060. Meanwhile, FIG. 3 illustrates that the light guide plate 2000 is a planar plate of which the thickness is entirely uniform, but the present invention is not limited thereto. For example, in the light guide plate 2000, it is possible that portions around a side surface thereof facing the light source 1642 may be thicker than other portions thereof to improve the efficiency of incident light.

The light guide plate 2000 receives light projected from the light source 1642 through the light incident surface 2060 and the light is guided by the light guide plate 2000 to be output in a face form of the light source 1642 through the light output surface 2020. The reflective surface 2040 serves to reflect light moved to a rear surface of the light guide plate 2000 to the light output surface 2020. Patterns for effectively receiving, guiding, and reflecting light may be respectively formed on the light incident surface 2060, the light output surface 2020, and the reflective surface 2040, and particularly, the reflection pattern 2200 may be formed on the reflective surface 2040 to reflect light moved to the rear surface of the light guide plate 2000, i.e., moved to the reflective surface 2040.

A plurality of reflection patterns 2200 may be formed on the reflective surface 2040. Here, the reflection patterns 2200 may be formed on the reflective surface 2040 with uniform density as shown in FIG. 4 or may be formed with non-uniform density as shown in FIG. 5. Particularly, in the case of a large screen, a difference of luminance between a region close to the light incident surface 2060 of the light guide plate 2000 and a region far therefrom may be generated, but the difference of luminance may be reduced by forming the reflection patterns 2200 more densely on the region far from the light incident surface 2060 than the region close thereto. Here, the density of the reflection patterns 2200 may be defined by a cover rate which means a ratio of the reflection patterns 2200 to the reflective surface 2040, a size of the reflection pattern 2200, an interval of the reflection patterns 2200, etc.

The reflection pattern 2200 may be formed by a silk screening technique, a printing technique or laser etching technique, a deposition technique, a pressing technique, a roll stamping technique, etc. The reflection pattern 2200 may be formed in a specific form to effectively refract or reflect light moved to the rear surface of the light guide plate 2000 to the light output surface 2020 by the above-described process and detailed descriptions for the formation of the reflection pattern 2200 will be described below.

Meanwhile, a serration pattern 2400 may be formed on the light incident surface 2060 of the light guide plate 2000 to improve a distribution angle of light incident from the light source 1642 and to increase a diffusion effect. The serration pattern 2400 may be formed on the light incident surface 2060 so that an embossed portion and a concave portion extending in a vertical direction as shown in FIG. 7 are repeatedly disposed in a direction of the width of the light incident surface 2060. Further, a light guide pattern 2600 for guiding light incident through the light incident surface 2060 to all regions of the light guide plate 2000 may be formed on the light output surface 2020 of the light guide plate 2000. The light guide pattern 2600 may be repeatedly formed on the light output surface 2020 to extend in a direction perpendicular to the light incident surface 2060, and may have a lenticular pattern form as shown in FIG. 8 or may be formed in a trigonal or tetragonal prism pattern form.

The above-described serration pattern 2400 or light guide pattern 2600 may be provided to the light guide plate 2000 with the reflection pattern 2200, and in some cases, all of the serration pattern 2400, the light guide pattern 2600, and the reflection pattern 2200 may be formed on the light guide plate 2000.

Hereinafter, the reflection pattern 2200 according to one embodiment of the present invention will be described.

The reflection pattern 2200 is formed in a specific form by protruding from or being recessed in the reflective surface 2040, and thus light moved to the rear surface of the light guide plate 2000 may be reflected. When the light is reflected as described above, an amount of light output through the light output surface 2020 of the light guide plate 2000 is eventually increased, and thus the luminance of the display device 1000 can be increased.

In the embodiment of the present invention, the reflection pattern 2200 may be basically provided in a dot pattern form. The entire reflection pattern 2200 may have a region protruding from the reflective surface 2040 in a circular shape, a recessed region surrounding the protruding region, and a protruding region surrounding the recessed region when viewed in a direction perpendicular to the reflective surface 2040.

The reflection pattern 2200 may be mainly formed by roll stamping or pressing. Specifically, the recessed region may be formed by pressuring the reflective surface 2040 using the roll stamping or pressing, and the protruding region may be formed because a material in the recessed region is moved to the vicinity thereof. At this time, the roll stamping or pressing using a thermal pressing method can effectively perform the above patterning process.

The reflection pattern 2200 reflects, refracts, or scatters light which is incident from the light incident surface 2060 and moved to the reflective surface 2040, or light which is reflected from the light output surface 2020 and moved to the reflective surface 2040 in each region, and thus light can be effectively reflected. Specifically, an outer protruding region of the reflection pattern 2200 first refracts, scatters, diffuses, or reflects light, and a recessed region and a central protruding region may refract, scatter, diffuse, or reflect the light again. Particularly, since the outer protrude region serves to first scatter light incident on the reflection pattern 2200, it is advantageous to increase in the luminance uniformity of the entire light output surface 2020.

Hereinafter, a first sample of various forms for the reflection pattern 2200 according to one embodiment of the present invention will be described.

Figure 9:
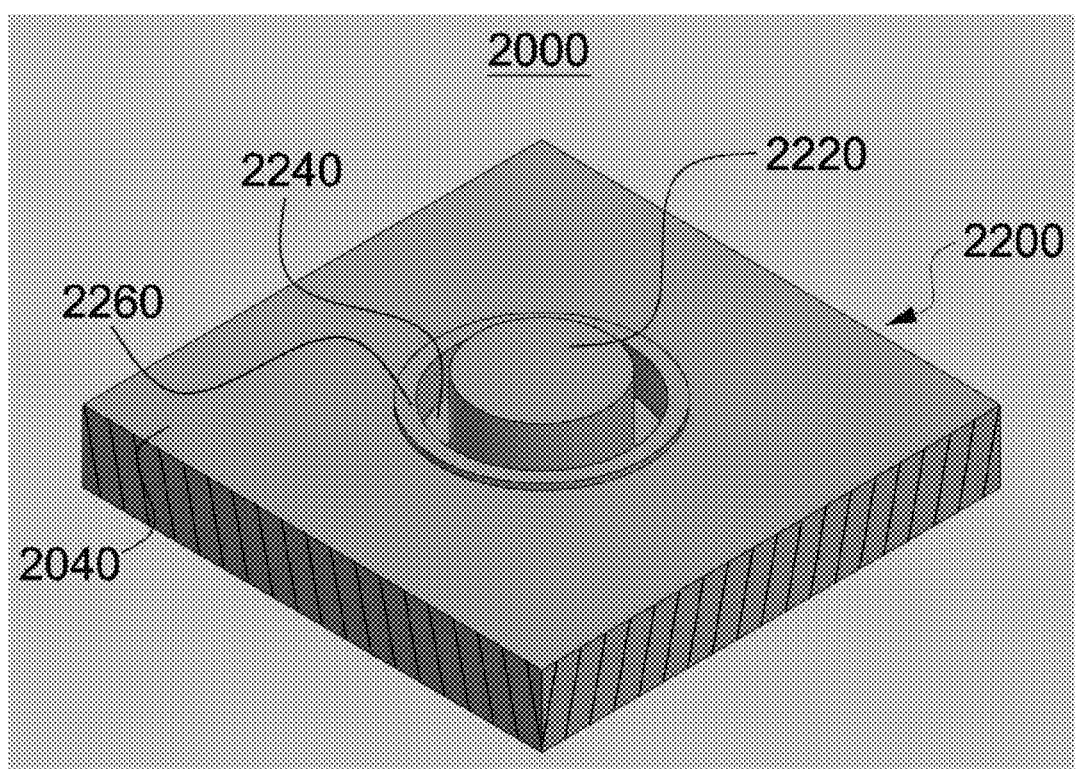
FIG. 9 is a perspective view of a first sample of a reflection pattern according to one embodiment of the present invention.
Figure 10:
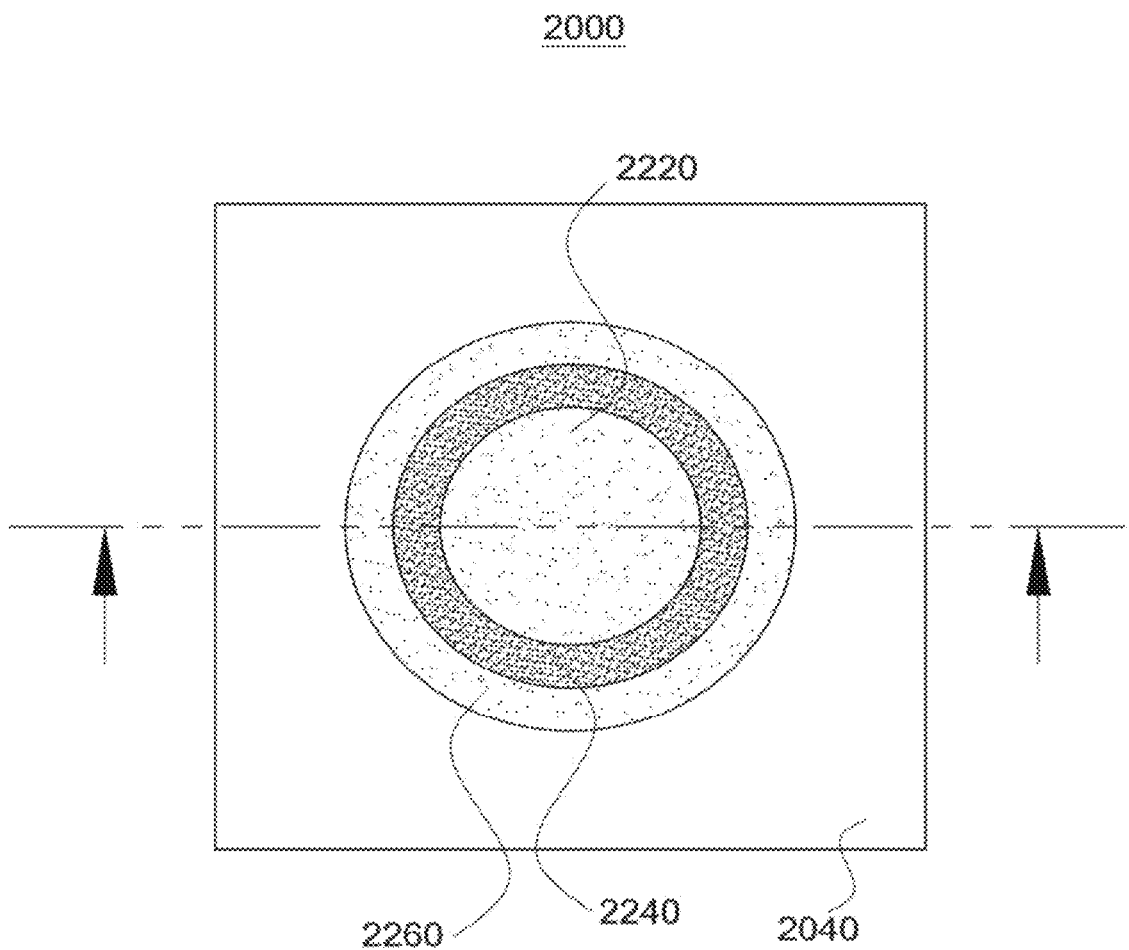
FIG. 10 is a plan view of the first sample of the reflection pattern according to one embodiment of the present invention.
Figure 11:
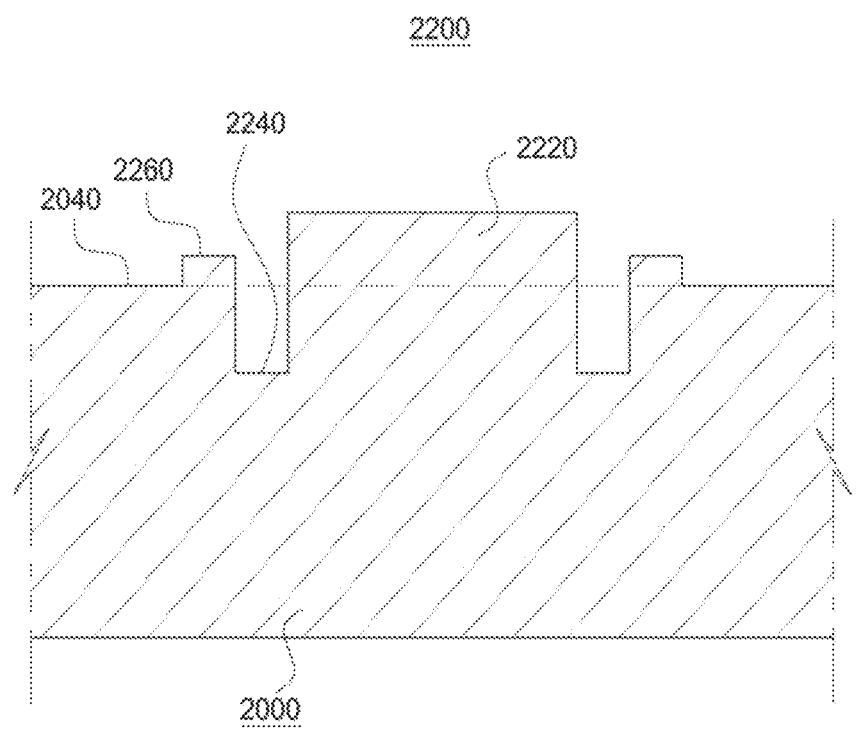
FIG. 11 is a cross-sectional view of the first sample of the reflection pattern according to one embodiment of the present invention.

FIG. 9 is a perspective view of the first sample of the reflection pattern 2200 according to one embodiment of the present invention, FIG. 10 is a plan view of the first sample of the reflection pattern 2200 according to one embodiment of the present invention, and FIG. 11 is a cross-sectional view of the first sample of the reflection pattern 2200 according to one embodiment of the present invention.

Referring to FIGS. 9, 10 and 11, a first form of the reflection pattern 2200 according to one embodiment of the present invention may include a central embossed portion 2220, a concave portion 2240, and an outer embossed portion 2260.

The central embossed portion 2220 is positioned at the center of the reflection pattern 2200 and is a portion protruding to the outside of a surface level of the reflective surface 2040. Here, the central embossed portion 2220 may be formed in a circular shape when viewed in a direction perpendicular to the reflective surface 2040. Further, in the first form of the reflection pattern 2200, the central embossed portion 2220 may protrude to have a uniform height in the entire circular shape.

The concave portion 2240 is positioned to surround the central embossed portion 2220 and is a portion recessed in the inside of the surface level of the reflective surface 2040. Here, the concave portion 2240 may be formed in a ring shape when viewed in a direction perpendicular to the reflective surface 2040. In the ring forming the concave portion 2240, the center thereof may be the same as the center of the circle forming the central embossed portion 2220. Further, in the first form of the reflection pattern 2200, the concave portion 2240 may be recessed to have a uniform depth in the entire ring shape.

The outer embossed portion 2260 is positioned to surround the concave portion 2240 and is a portion protruding to the outside of the surface level of the reflective surface 2040. Here, the outer embossed portion 2260 may be formed in a ring shape when viewed in a direction perpendicular to the reflective surface 2040. In the ring forming the outer embossed portion 2260, the center thereof may be the same as the centers of the circle forming the central embossed portion 2220 and the ring forming the concave portion 2240. Further, in the first form of the reflection pattern 2200, the outer embossed portion 2260 may protrude to have a uniform height in the entire ring shape.

Hereinafter, a second sample of various forms for the reflection pattern 2200 according to one embodiment of the present invention will be described.

Figure 12:
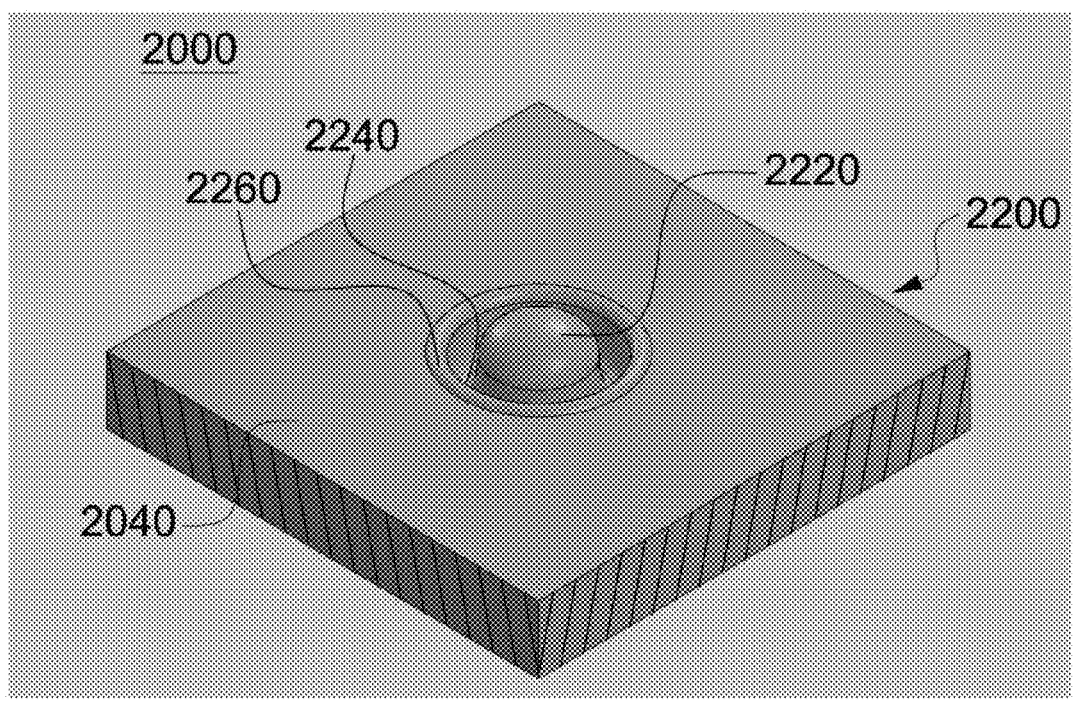
FIG. 12 is a perspective view of a second sample of a reflection pattern according to one embodiment of the present invention.
Figure 13:
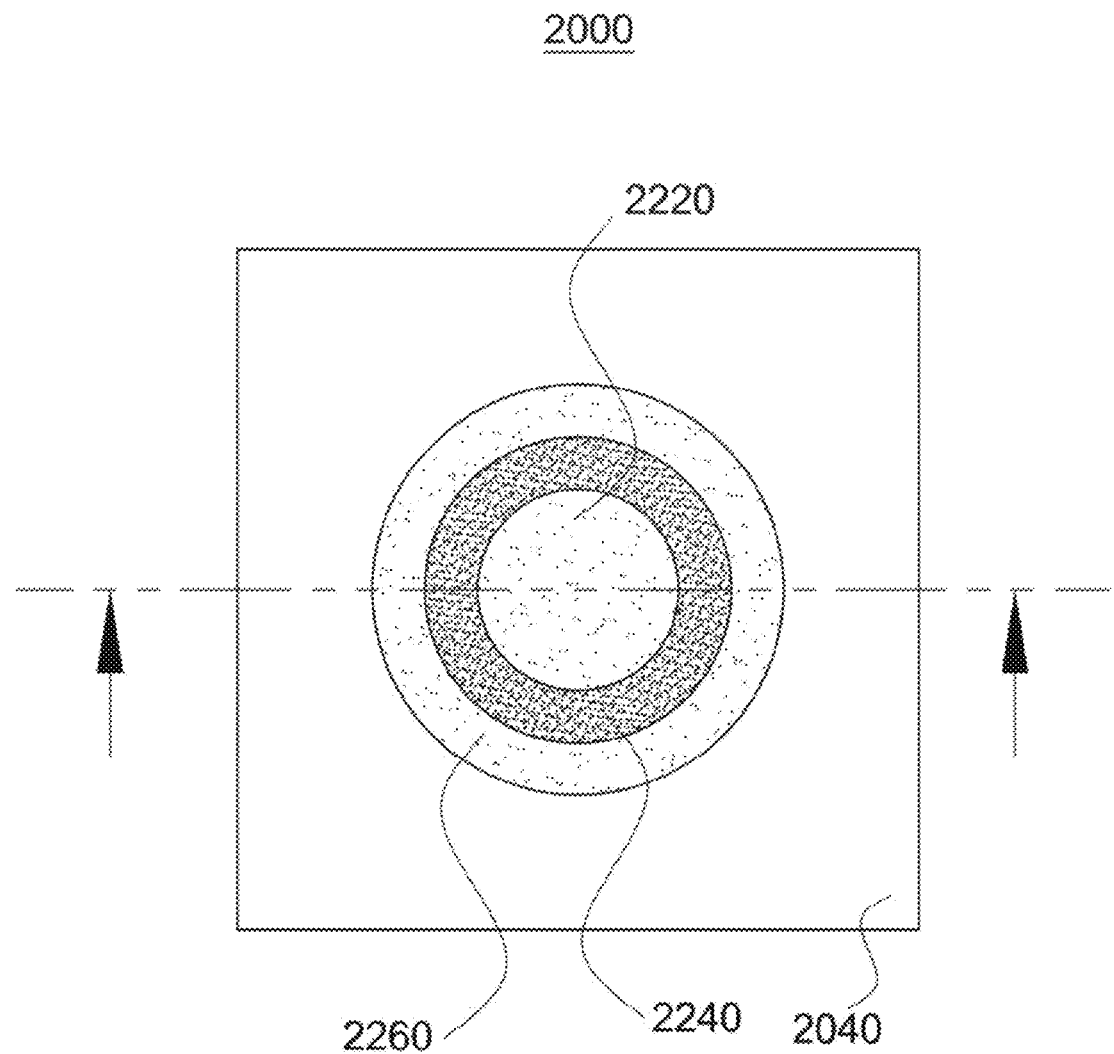
FIG. 13 is a plan view of the second sample of the reflection pattern according to one embodiment of the present invention.
Figure 14:
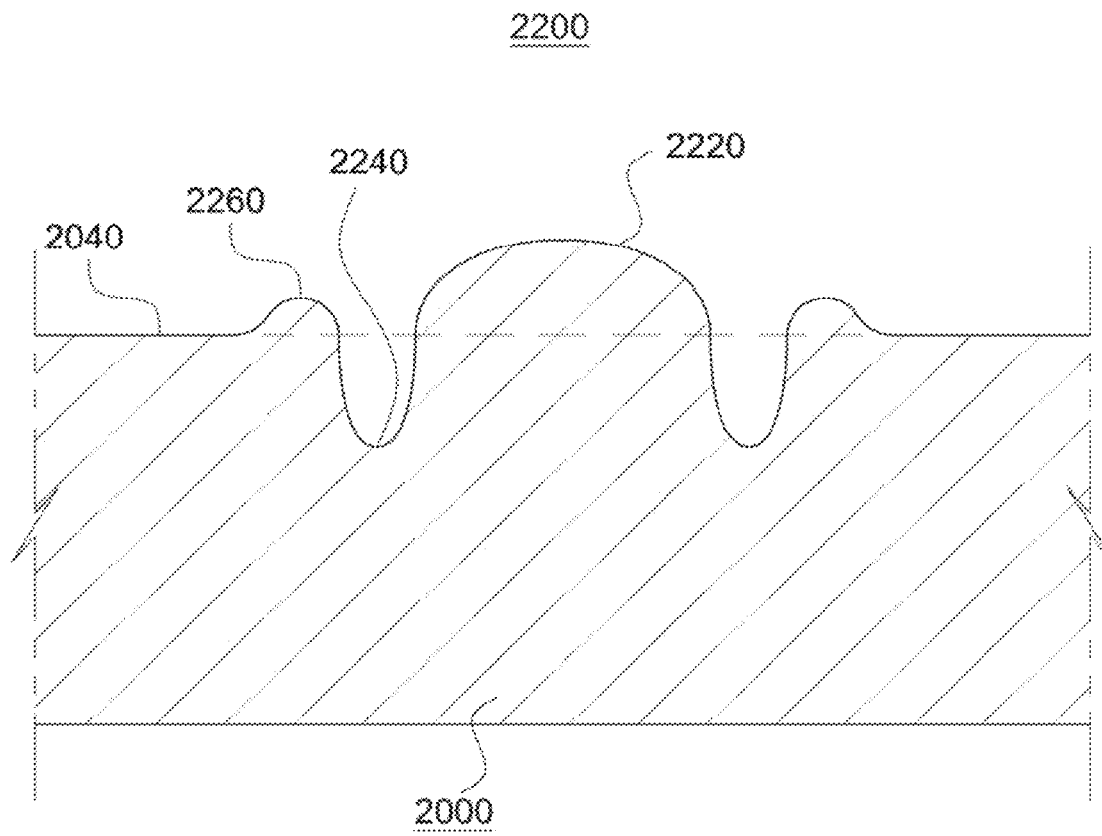
FIG. 14 is a cross-sectional view of the second sample of the reflection pattern according to one embodiment of the present invention.

FIG. 12 is a perspective view of the second sample of the reflection pattern 2200 according to one embodiment of the present invention, FIG. 13 is a plan view of the second sample of the reflection pattern 2200 according to one embodiment of the present invention, and FIG. 14 is a cross-sectional view of the second sample of the reflection pattern 2200 according to one embodiment of the present invention.

Referring to FIGS. 12, 13 and 14, a second form of the reflection pattern 2200 according to one embodiment of the present invention may include a central embossed portion 2220, a concave portion 2240, and an outer embossed portion 2260 similar to the first form. However, the central embossed portion 2220, the concave portion 2240, and the outer embossed portion 2260 are recessed or protrude in a direction perpendicular to the reflective surface 2040 in the first form, but are recessed or protrude to have surfaces thereof in curved shapes in the second form.

The central embossed portion 2220 is positioned at the center of the reflection pattern 2200 and is a portion protruding to the outside of a surface level of the reflective surface 2040. Here, the central embossed portion 2220 may be formed in a circular shape when viewed in a direction perpendicular to the reflective surface 2040.

In the second form of the reflection pattern 2200, the center of the central embossed portion 2220 may have a maximum height, and heights of other portions may be gradually decreased to the same level as the surface level of the reflective surface 2040 in proportion to a distance from the center thereof. For example, in a cross sectional view, the central embossed portion 2220 may protrude from the surface level of the reflective surface 2040 in a curved surface shape such as a circular arc shape, an elliptical arc shape, a parabolic shape, etc. Preferably, an edge of the central embossed portion 2220 may be formed to have a relatively steep slope and a portion closer to the center thereof may have a further gentle slope. The central embossed portion 2220 of which a surface is processed in the curved shape as described above may have an advantageous effect of easily refracting, scattering, or reflecting incident light in a wide range.

The concave portion 2240 is positioned to surround the central embossed portion 2220, and a portion recessed in the inside of the surface level of the reflective surface 2040. Here, the concave portion 2240 may be formed in a ring shape when viewed in a direction perpendicular to the reflective surface 2040. The center of the ring forming the concave portion 2240 may be the same as the center of a circle forming the central embossed portion 2220.

In the second form of the reflection pattern 2200, a height of an inner circumference of the concave portion 2240 (i.e., a boundary connected to the central embossed portion 2220) is flush with the surface level of the reflective surface 2040, a depth thereof is gradually increased to a maximum depth from the inner circumference in a predetermined distance, in proportion to a distance from the inner circumference, and the depth is gradually decreased with the approach to an outer circumference (i.e., a boundary connected to the outer embossed portion 2260) after a portion at the maximum depth is passed, and thus a height of the outer circumference may be flush with the surface level of the reflective surface 2040. Here, a planar portion having a uniform depth may be provided at the portion having the maximum depth. Further, in the concave portion 2240, a slope of a portion near the inner circumference may be formed to be greater than that of a portion near the outer circumference. For example, in a cross sectional view, the concave portion 2240 may be recessed from the surface level of the reflective surface 2040 in a curved surface shape such as a circular arc shape, an elliptical arc shape, a parabolic shape, etc. The concave portion 2240 of which a surface is processed in the curved shape as described above may have an advantageous effect of easily refracting, scattering, or reflecting incident light in a wide range.

The outer embossed portion 2260 is positioned to surround the concave portion 2240, and a portion protruding to the outside of the surface level of the reflective surface 2040. Here, the outer embossed portion 2260 may be formed in a ring shape when viewed in a direction perpendicular to the reflective surface 2040. The center of the ring forming the outer embossed portion 2260 may be the same as the centers of the circle forming the central embossed portion 2220 and the ring of the concave portion 2240.

In the second form of the reflection pattern 2200, a height of an inner circumference of the outer embossed portion 2260 (i.e., a boundary connected to the concave portion 2240) is flush with the surface level of the reflective surface 2040, and a height thereof is gradually increased to a maximum height from the inner circumference in a predetermined distance, in proportion to a distance from the inner circumference, and after a portion at the maximum height is passed, the height is gradually decreased, and thus the height may be flush with the surface level of the reflective surface 2040 and an outer circumference thereof may be formed. Here, in the outer embossed portion 2260, a slope of a portion near the inner circumference may be formed to be greater than that of a portion near the outer circumference. For example, in a cross sectional view, the outer embossed portion 2260 may protrude from the surface level of the reflective surface 2040 in a curved surface shape such as a circular arc shape, an elliptical arc shape, a parabolic shape, etc. The outer embossed portion 2260 of which a surface is processed in the curved shape as described above may have an advantageous effect of easily refracting, scattering, or reflecting incident light in a wide range. Particularly, the outer embossed portion 2260 is disposed as an outermost portion in the reflection pattern 2200 and serves to first scatter light incident on the reflection pattern 2200 so that light reflected by the reflection pattern 2200 is scattered and diffused in a forward direction and guided to the light output surface 2020, and thus the luminance uniformity thereof can be greatly improved.

Hereinafter, a third sample of various forms for the reflection pattern 2200 according to one embodiment of the present invention will be described.

Figure 15:
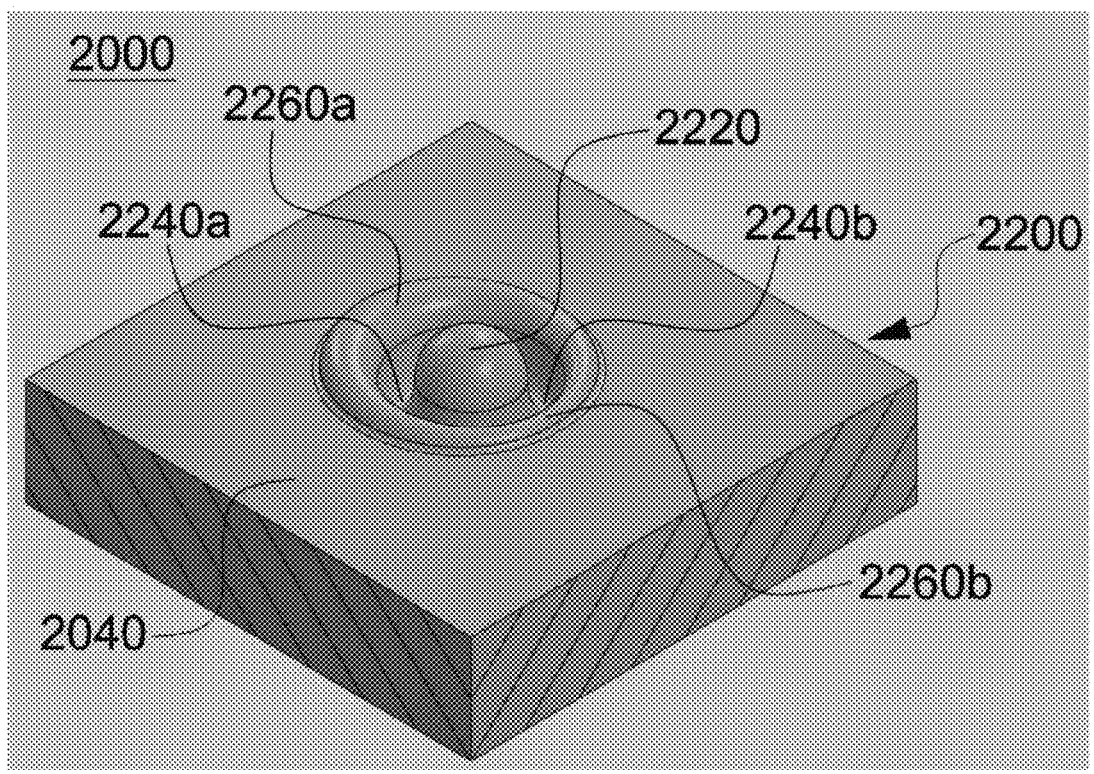
FIG. 15 is a perspective view of a third sample of a reflection pattern according to one embodiment of the present invention.
Figure 16:
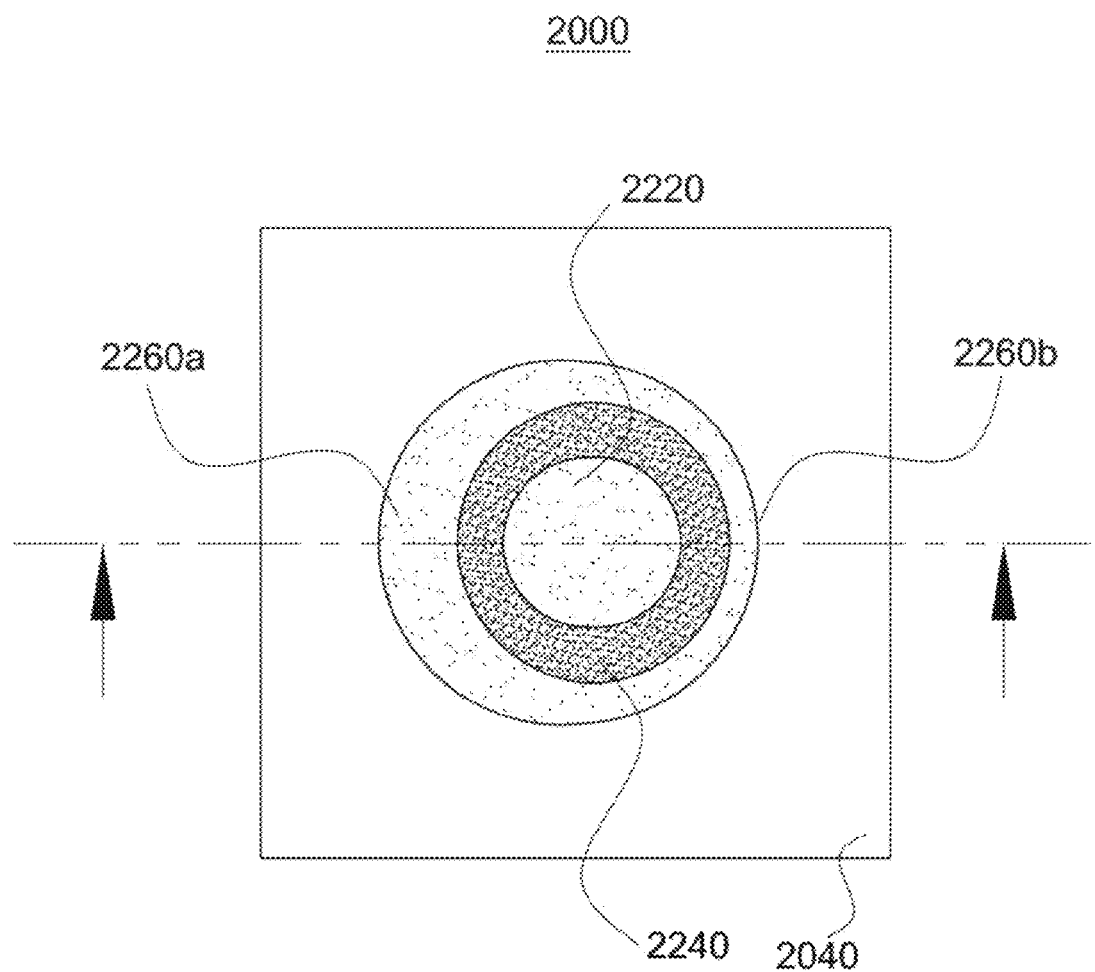
FIG. 16 is a plan view of the third sample of the reflection pattern according to one embodiment of the present invention.
Figure 17:
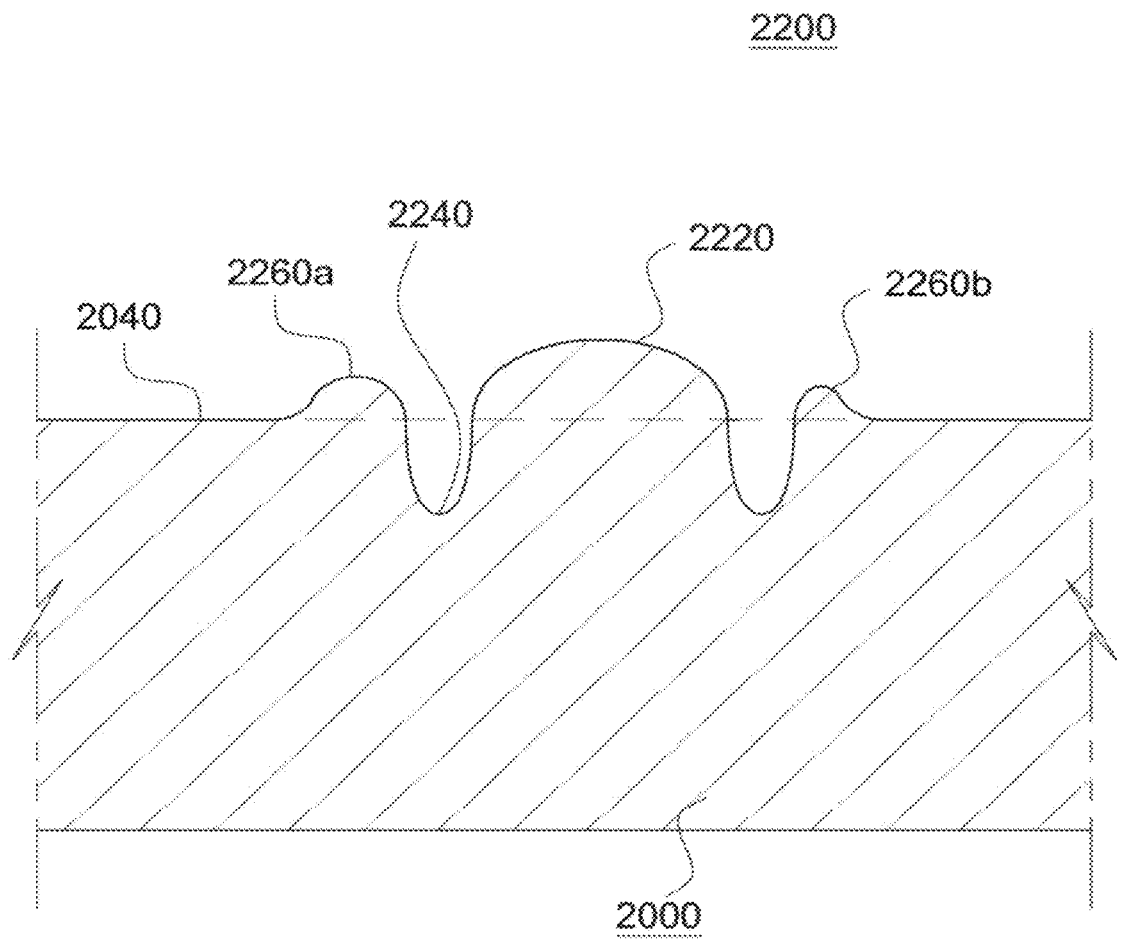
FIG. 17 is a cross-sectional view of the third sample of the reflection pattern according to one embodiment of the present invention.

FIG. 15 is a perspective view of the third sample of the reflection pattern 2200 according to one embodiment of the present invention, FIG. 16 is a plan view of the third sample of the reflection pattern 2200 according to one embodiment of the present invention, and FIG. 17 is a cross-sectional view of the third sample of the reflection pattern 2200 according to one embodiment of the present invention.

Referring to FIGS. 15, 16 and 17, a third form of the reflection pattern 2200 according to one embodiment of the present invention may include a central embossed portion 2220, a concave portion 2240, and an outer embossed portion 2260 processed in a curved surface shape similar to the second form. However, the central embossed portion 2220, the concave portion 2240, and the outer embossed portion 2260 in the second form have symmetrical shapes when viewed in a direction perpendicular to the reflective surface 2040, but they may have unsymmetrical shapes in the third form.

In the reflection pattern 2200 having the third form, since shapes of the central embossed portion 2220 and concave portion 2240 may be entirely similar to shapes of the central embossed portion 2220 and the concave portion 2240 in the second form of the reflection pattern 2200, the descriptions thereof will be omitted.

Meanwhile, in the reflection pattern 2200 having the third form, the outer embossed portion 2260 is formed in a ring shape when viewed in a direction perpendicular to the reflective surface 2040, but the center of the ring forming the outer embossed portion 2260 may be different from the centers of the circle forming the central embossed portion 2220 and the ring forming the concave portion 2240.

As shown in FIGS. 15 and 16, when viewed in a direction perpendicular to the reflective surface 2040, the thickness (i.e., a distance from a boundary with the concave portion 2240 to a point contacting the surface level of the reflective surface 2040) of the outer embossed portion 2260 is great in one direction, and the thickness is gradually decreased, and thus the thickness may be the smallest in an opposite direction. Further, in a cross sectional view as shown in FIGS. 15 and 17, in the outer embossed portion 2260, the maximum height thereof in the one direction is the greatest and is gradually decreased, and thus may be the smallest in the opposite direction.

Since the shape of the third form of the reflection pattern 2200 is unsymmetrical, the optical characteristics thereof may be shown to be anisotropic rather than isotropic. In detail, the effect of light scattering is greater in the one direction in which the thickness is great and the maximum height is great than in the opposite direction. A better viewing angle may be provided in the opposite direction compared to in the one direction. Accordingly, when the anisotropic optical characteristics are used, the luminance uniformity or viewing angle of the display device 1000 can be improved.

Figure 18:
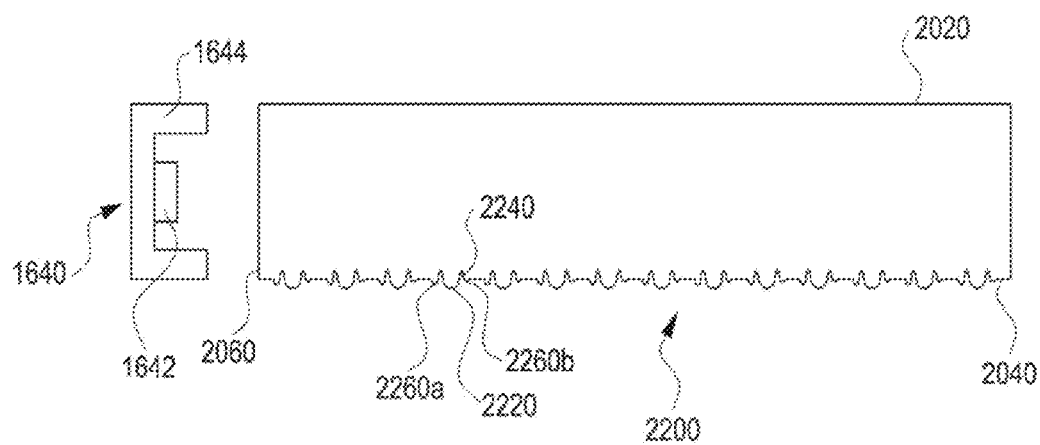
FIG. 18 is a cross-sectional view of a light guide plate having an unsymmetrical reflection pattern according to one embodiment of the present invention.

FIG. 18 is a cross-sectional view of a light guide plate 2000 having an unsymmetrical reflection pattern 2200 according to one embodiment of the present invention.

Referring to FIG. 18, in the reflection pattern 2200, a portion in one direction, in which the height of the outer embossed portion 2260 is great and the thickness thereof is great, may be disposed on the reflective surface 2040 in a direction close to the light incident surface 2060. Generally, light moving to the reflection pattern 2200 is mainly moved from a direction of the light incident surface 2060, and thus a region having the great height and thickness of the outer embossed portion 2260 is disposed in the above-described direction of incident light and effects of light diffusion and scattering of the outer embossed portion 2260 can be maximized.

Meanwhile, a viewing angle in a lateral direction is more important than a viewing angle in a vertical direction in the display device 1000, and thus, when a portion having the great maximum height and thickness of the outer embossed portion 2260 is disposed in the vertical direction while watching the display device 1000, the degradation of the viewing angle can be prevented. Furthermore, in a vertical viewing angle, according to which viewing angle between a viewing angle in a downward direction and a viewing angle in an upward direction is more important, the portion having the great maximum height and thickness of the outer embossed portion 2260 may be disposed in the upward direction or in the downward direction of the display device 1000.

Meanwhile, to be implemented for securing both of the luminance uniformity and viewing angle of the display device 1000, the light source array 1640 is disposed in the downward direction and the reflection pattern 2200 is formed so that the portion having the great outer embossed portion 2260 in the reflection pattern 2200 is disposed in the downward direction, and thus both of the luminance uniformity and viewing angle can be realized.

Hereinafter, a fourth sample of various forms for the reflection pattern 2200 according to one embodiment of the present invention will be described.

Figure 19:
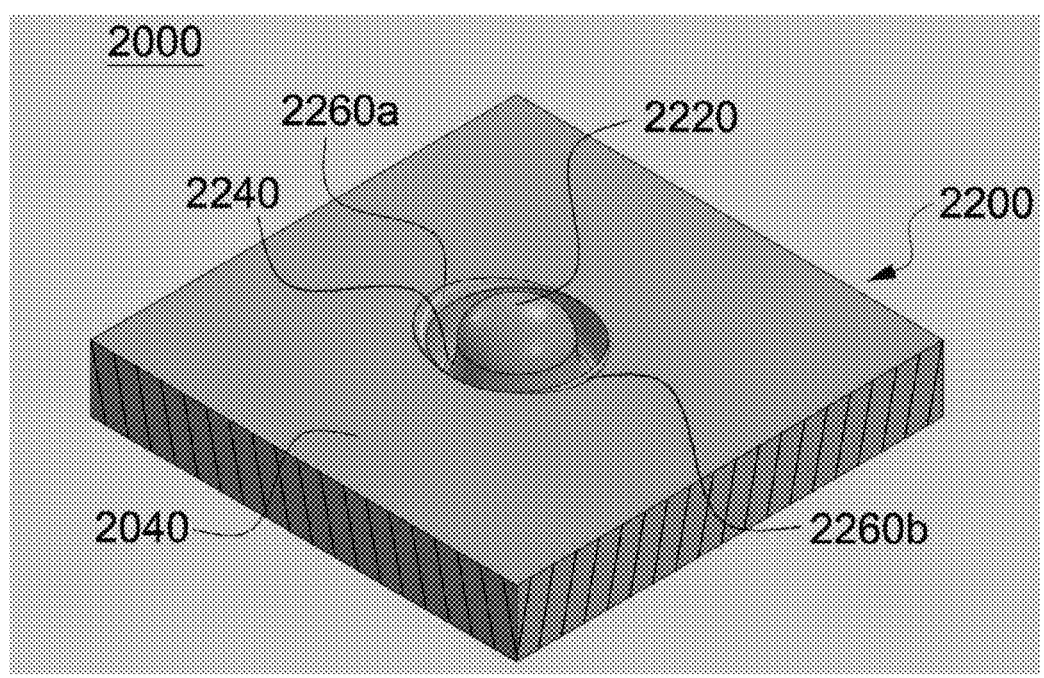
FIG. 19 is a perspective view of a fourth sample of a reflection pattern according to one embodiment of the present invention.
Figure 20:
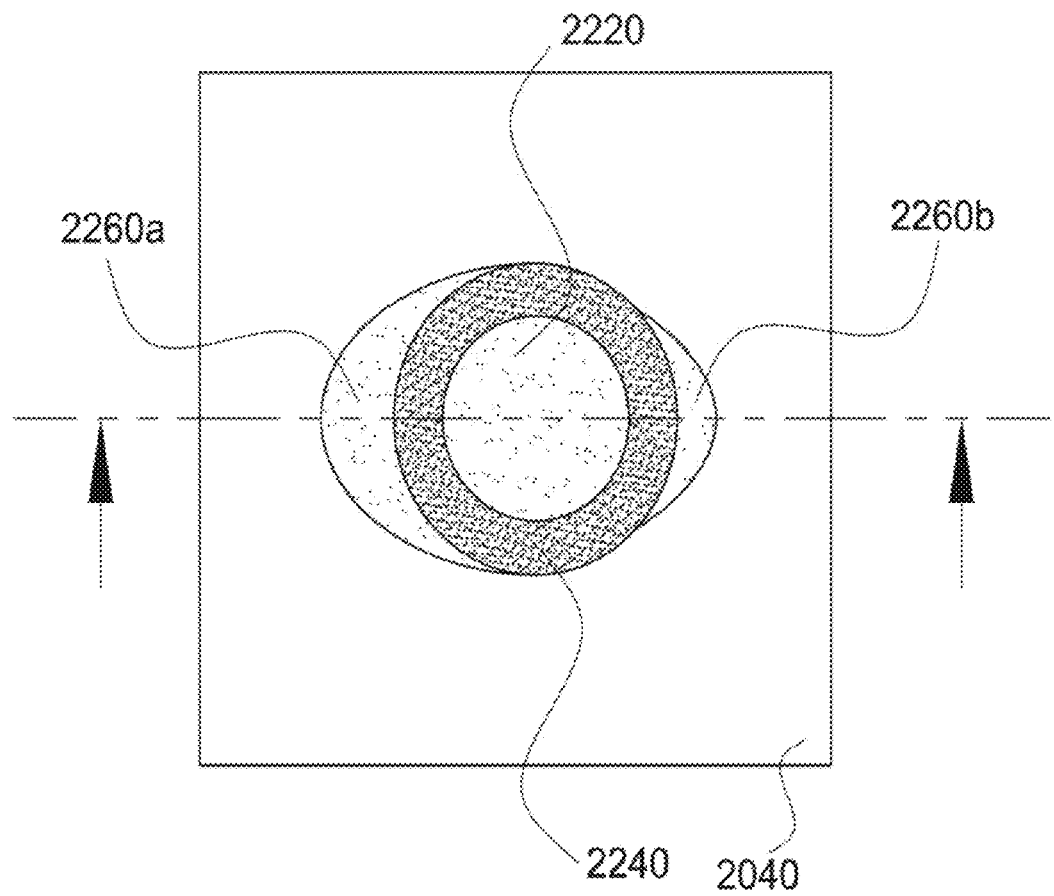
FIG. 20 is a plan view of the fourth sample of the reflection pattern according to one embodiment of the present invention.
Figure 21:
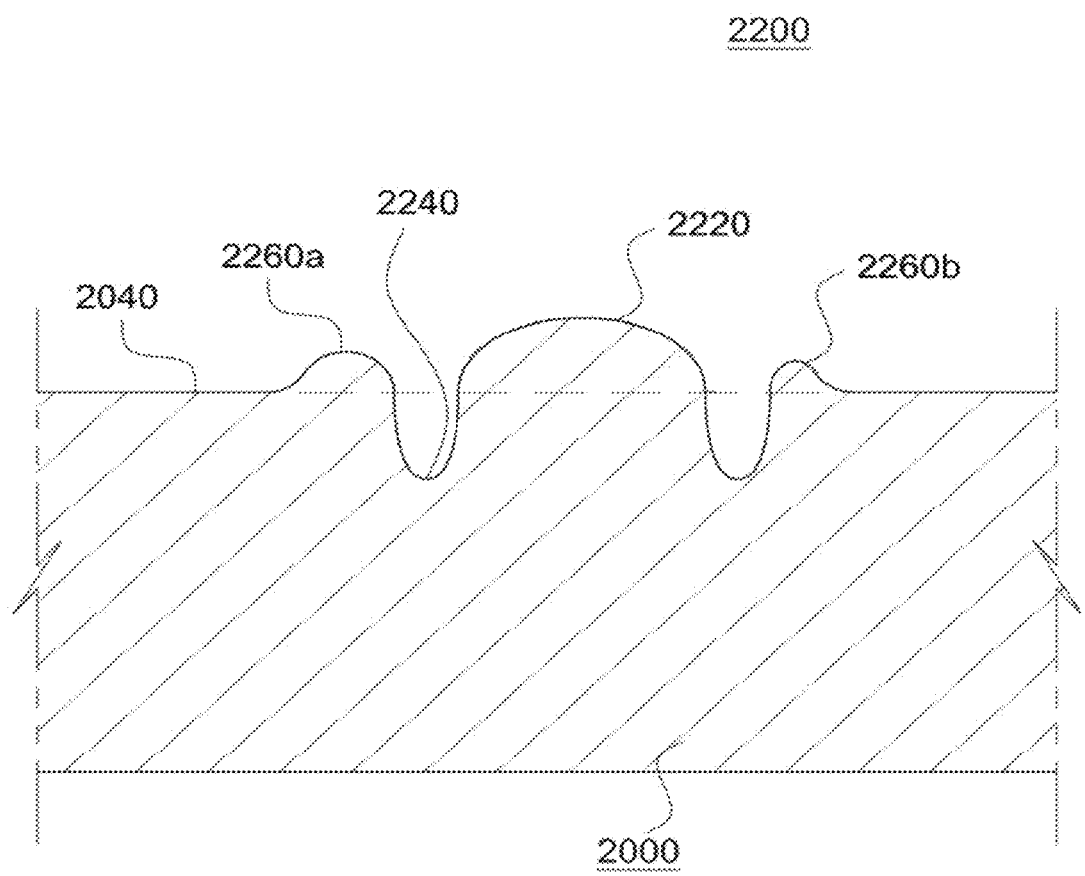
FIG. 21 is a cross-sectional view of the fourth sample of the reflection pattern according to one embodiment of the present invention.

FIG. 19 is a perspective view of the fourth sample of the reflection pattern 2200 according to one embodiment of the present invention, FIG. 20 is a plan view of the fourth sample of the reflection pattern 2200 according to one embodiment of the present invention, and FIG. 21 is a cross-sectional view of the fourth sample of the reflection pattern 2200 according to one embodiment of the present invention.

Referring to FIGS. 19, 20 and 21, a fourth form of the reflection pattern 2200 according to one embodiment of the present invention is similar to the third form and may have a central embossed portion 2220 and a concave portion 2240. However, the outer embossed portion 2260 was formed as one body in the third form, whereas a pair of outer embossed portions 2260a and 2260b may be disposed at opposite sides facing each other based on the center of the reflection pattern 2200. Here, in the outer embossed portion 2260, the maximum height and thickness of one of the pair of outer embossed portions, e.g., outer embossed portion 2260a, may be greater than those of the other thereof, e.g., outer embossed portion 2260b.

The above-described form has a form in which a part of the concave portion 2240 is not surrounded by the outer embossed portion 2260, and thus it can have an advantageous effect of maximally improving a viewing angle in a corresponding direction.

Meanwhile, the above-described fourth form of the reflection pattern 2200 has anisotropic optical characteristics due to an unsymmetrical shape like the third form of the reflection pattern 2200, and the arrangement of the reflection pattern 2200 for using the unsymmetrical shape and anisotropic optical characteristics is similar to the third form. However, since the concave portion 2240 is in direct contact with the reflective surface 2040 in this case, the effect of viewing angle improvement can be more excellent.

Hereinafter, a fifth example of various forms for the reflection pattern 2200 according to one embodiment of the present invention will be described.

Figure 22:
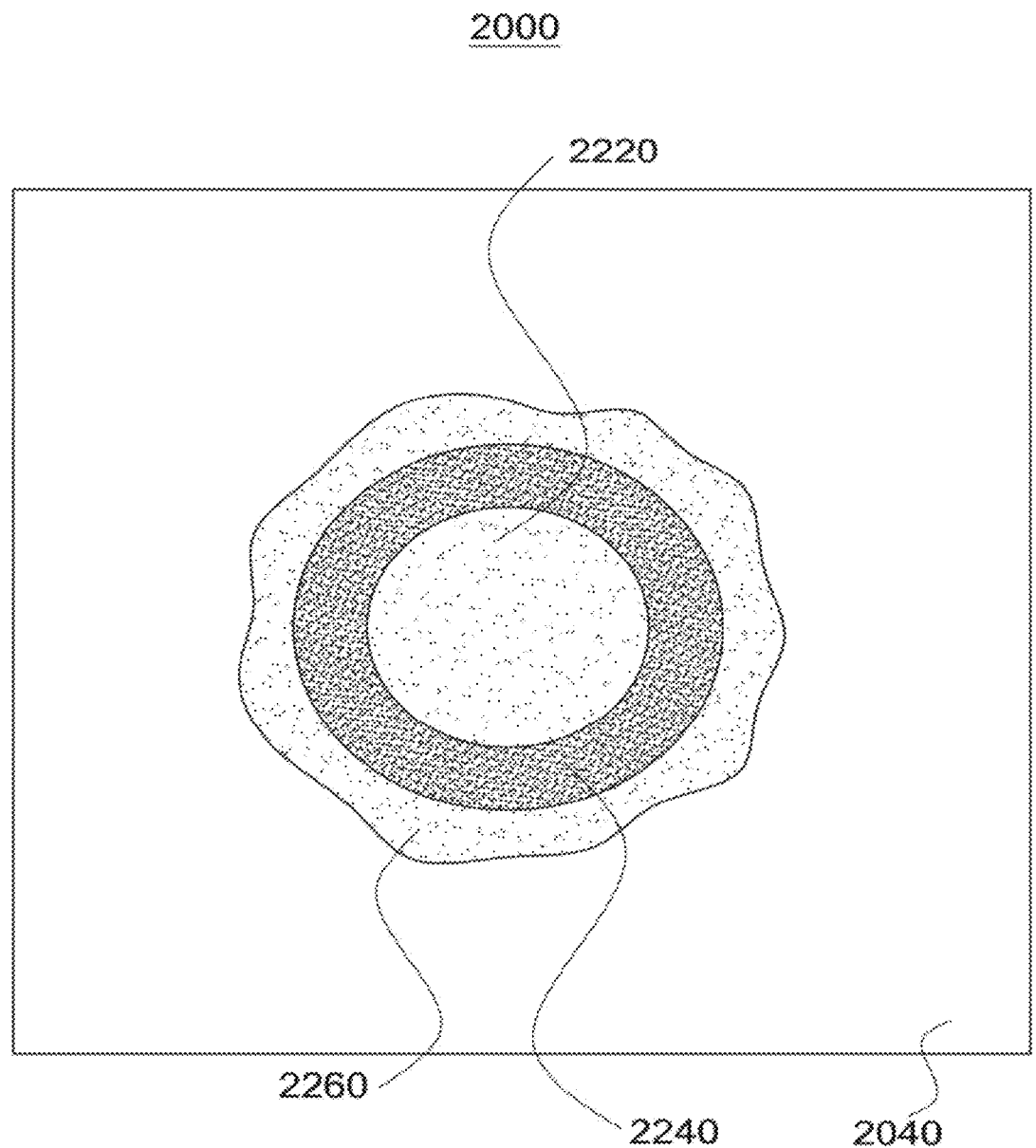
FIG. 22 is a plan view of a fifth example of a reflection pattern according to one embodiment of the present invention.

FIG. 22 is a plan view of a fifth example of the reflection pattern 2200 according to one embodiment of the present invention.

Referring to FIG. 22, the outer embossed portion 2260 is generally provided in a ring shape, but a boundary thereof may be irregularly formed instead of a circular arc shape. When the boundary of the outer embossed portion 2260 is irregularly formed as described above, there is an advantage of maximizing the effect of light scattering by the outer embossed portion 2260.

In the above-described reflection pattern 2200 according to one embodiment of the present invention, when comparing distances in a vertical direction (i.e., an absolute value of a height or depth), the maximum depth of the concave portion 2240 is the greatest, the maximum height of the central embossed portion 2220 is the next greatest, and the maximum height of the outer embossed portion 2260 may be the smallest. In detail, the height of the central embossed portion 2220 is approximately 1.2 to 8 times the height of the outer embossed portion 2260, and the depth of the concave portion 2240 may be approximately 2 to 14 times the height of the outer embossed portion 2260.

Further, in the reflection pattern 2200, a diameter of the central embossed portion 2220 may be approximately 60 to 85% of an overall diameter, an outer diameter of the concave portion 2240 may be approximately 80 to 98% thereof, and an outer diameter of the outer embossed portion 2260 may be approximately 85 to 100% thereof.

For example, in the reflection pattern 2200, the central embossed portion 2220 may be formed to have a maximum height in a range of 1 to 7 μm, and a diameter (i.e., two times a radius which is a distance from the center of the reflection pattern 2200 to a point of which a height is flush with the surface level of the reflective surface 2040) in a range of 35 to 55 μm, the concave portion 2240 may be formed to have a maximum depth in a range of 2 to 13 μm, and an outer diameter (i.e., two times a distance from the center of the reflection pattern 2200 to a point of a which height is flush with the surface level of the reflective surface 2040) in a range of 40 to 65 μm, and the outer embossed portion 2260 may be formed to have a maximum height in a range of 0.5 to 5 μm, and an outer diameter (i.e., two times a distance from the center of the reflection pattern 2200 to a point of a which height is flush with the surface level of the reflective surface 2040) in a range of 40 to 70 μm.

Further, when the reflection pattern 2200 may be formed in a curved surface shape, a slope angle at a portion in which the concave portion 2240 is connected to the outer embossed portion 2260 may be the greatest, a slope angle at a portion in which the central embossed portion 2220 is connected to the concave portion 2240 may be the next greatest, and a slope angle at a portion in which the outer embossed portion 2260 is connected to the surface level of the reflective surface 2040 may be the smallest when comparing slope angles at each portion.

Further, the above drawings illustrate the smooth surface of the reflection pattern 2200, but the surface of the reflection pattern 2200 may have a predetermined roughness, and particularly, the concave portion 2240 and the outer embossed portion 2260 may have a roughness having a predetermined value or more.

However, in the above descriptions, the specifications of the reflection pattern 2200 are not limited to the above-described height, depth, diameter, slope angle, roughness, etc., and it should be noted that they are suitably changeable if needed.

All of the reflection patterns 2200 formed on the reflective surface 2040 may be formed to have substantially the same specifications or different specifications of the reflection pattern 2200 based on portions of the reflective surface 2040 if needed. For example, when all of the reflection patterns 2200 are formed with the same specifications, there are advantages for manufacturing, and thus a production cost can be reduced. In the reverse case, when the diameter of the reflection pattern 2200 is adjusted to be small with the approach to the light incident surface 2060, the luminance uniformity of the entire light output surface 2020 of the light guide plate 2000 can be improved.

The foregoing is illustrative of embodiments and is not to be construed as limiting thereof. Although a few embodiments have been described, those skilled in the art will readily appreciate that many modifications are possible in embodiments without materially departing from the novel teachings and advantages. Accordingly, all such modifications are intended to be included within the scope of this inventive concept as defined in the claims.

GLOSSARY

1000: display device
1200: housing
1400: display panel
1600: backlight unit
2000: light guide plate
2040: reflective surface
2200: reflection pattern
2220: central embossed portion
2240: concave portion
2260: outer embossed portion

What is claimed is:

1. A light guide plate comprising:
   a body including a light output surface configured to output light, a reflective surface provided opposite the light output surface, and side surfaces provided between the light output surface and the reflective surface; and
   a plurality of dot patterns formed on a surface of the reflective surface,
   wherein each of the dot patterns includes a central embossed portion protruding to the outside of the reflective surface, a concave portion having a ring shape which surrounds the central embossed portion and recessed and formed in the reflective surface, and an outer embossed portion formed on an outer circumference surface of the concave portion and configured to protrude to the outside of the reflective surface,
   wherein the outer embossed portion is formed in a ring shape along the outer circumference surface of the concave portion,
   wherein the center of the ring forming the outer embossed portion is different from the centers of the circle forming the central embossed portion and the ring forming the concave portion,
   wherein in the outer embossed portion, a height and thickness of a region close to a first side surface of the side surfaces is greater than those of a region close to a second side surface facing the first side surface of the side surfaces, and
   wherein the first side surface is a light incident surface which receives light from a light source.

2. The light guide plate of claim 1, wherein in the outer embossed portion, a height of a region close to a third side surface connected to the first side surface of the side surfaces is substantially the same as that of a region close to a fourth side surface facing the third side surface of the side surfaces.

3. The light guide plate of claim 1, wherein a plurality of serration patterns formed in embossed or concaved shapes in a vertical direction are formed on the light incident surface.

4. The light guide plate of claim 1, wherein:
   the central embossed portion and the concave portion diffuse light when the light incident on the dot pattern is output in an upward direction through the light output surface; and
   the outer embossed portion scatters light when the light incident on the dot pattern moves to the central embossed portion and the concave portion.

5. The light guide plate of claim 1, wherein a height of the central embossed portion is greater than that of the outer embossed portion.

6. The light guide plate of claim 2, wherein in the outer embossed portion, the heights of the regions close to the third side surface and the fourth side surface are smaller than the height of the region close to the first side surface, and greater than the height of the region close to the second side surface.

7. The light guide plate of claim 2, wherein in the outer embossed portion, the heights of the regions close to the third side surface and the fourth side surface are smaller than the heights of the regions close to the first side surface and the second side surface.

8. The light guide plate of claim 4, wherein in the outer embossed portion, a height of a region close to a light incident surface of the side surfaces on which light is incident is formed to be the greatest to scatter the light moved from a light source to the dot pattern.

9. The light guide plate of claim 5, wherein a depth of the concave portion is greater than a height of the central embossed portion.

10. The light guide plate of claim 5, wherein a radius of the central embossed portion is greater than a width of the concave portion, and a width of the outer embossed portion is smaller than the width of the concave portion.

11. A backlight unit comprising:
    a light source configured to output light; and
    a light guide plate including a light incident surface positioned to face the light source and configured to receive the light emitted from the light source, a light output surface connected to the light incident surface and configured to output the light in a direction of a display panel, and a reflective surface opposite the light output surface,
    wherein a plurality of dot patterns are formed on the reflective surface to change a path of the output light,
    wherein each of the dot patterns includes a central embossed portion formed in a circular shape, a concave portion formed in a ring shape which surrounds the central embossed portion, and an outer embossed portion formed on an outer circumference surface of the concave portion and configured to scatter light moved to the central embossed portion and the concave portion,
    wherein the outer embossed portion is formed in a ring shape along the outer circumference surface of the concave portion,
    wherein the center of the ring forming the outer embossed portion is different from the centers of the circle forming the central embossed portion and the ring forming the concave portion,
    wherein in the outer embossed portion, a height and thickness of a region close to a first side surface of the side surfaces is greater than those of a region close to a second side surface facing the first side surface of the side surfaces, and wherein the first side surface is a light incident surface which receives light from a light source.

12. The backlight unit of claim 11, wherein a height of the central embossed portion is greater than that of the outer embossed portion and smaller than a depth of the concave portion.

* * * * *